United States Patent
Rutkowski

[11] Patent Number: 5,989,320
[45] Date of Patent: Nov. 23, 1999

[54] FRAMELESS ELECTROSTATIC AIR FILTER WITH INTERNAL SUPPORT GRILL

[76] Inventor: Timothy C. Rutkowski, 8128 E. Gale Rd., Prescott Valley, Ariz. 86314

[21] Appl. No.: 08/987,498

[22] Filed: Dec. 9, 1997

Related U.S. Application Data

[60] Provisional application No. 60/044,041, May 5, 1997.

[51] Int. Cl.⁶ .................................. B03C 3/28; B03C 3/30
[52] U.S. Cl. .................................. 96/55; 55/486; 55/528; 55/DIG. 39; 96/17; 96/59; 96/66; 96/226
[58] Field of Search .................................. 96/57–59, 66, 96/226, 55, 17; 55/528, 486, DIG. 39

[56] References Cited

U.S. PATENT DOCUMENTS

| | | | |
|---|---|---|---|
| 3,117,849 | 1/1964 | Selke | 96/58 |
| 3,763,633 | 10/1973 | Soltis | 96/58 |
| 3,768,642 | 10/1973 | Hansen et al. | 206/321 |
| 3,877,909 | 4/1975 | Hansen | 55/487 |
| 4,549,887 | 10/1985 | Joannou | 96/58 |
| 4,902,306 | 2/1990 | Burnett et al. | 95/69 |
| 5,108,470 | 4/1992 | Pick | 96/58 |
| 5,188,646 | 2/1993 | Nolen, Jr. | 96/59 X |
| 5,330,559 | 7/1994 | Cheney et al. | 95/63 |
| 5,336,299 | 8/1994 | Savell | 95/70 |
| 5,403,482 | 4/1995 | Steere et al. | 210/489 |
| 5,419,953 | 5/1995 | Chapman | 96/58 X |
| 5,474,599 | 12/1995 | Cheney et al. | 96/55 |
| 5,509,950 | 4/1996 | van de Graaf et al. | 55/486 |
| 5,573,577 | 11/1996 | Joannou | 96/66 |
| 5,593,479 | 1/1997 | Frey et al. | 96/57 |
| 5,597,645 | 1/1997 | Pike et al. | 96/99 |
| 5,616,169 | 4/1997 | de Ruiter et al. | 95/90 |
| 5,618,324 | 4/1997 | Sommer et al. | 55/497 |
| 5,639,287 | 6/1997 | Van de Graaf et al. | 55/DIG. 39 |
| 5,647,881 | 7/1997 | Zhang et al. | 55/DIG. 39 |
| 5,679,122 | 10/1997 | Moll et al. | 55/DIG. 39 |

FOREIGN PATENT DOCUMENTS

| | | | |
|---|---|---|---|
| 2354125 | 2/1978 | France | 55/482 |
| 1203936 | 10/1965 | Germany . | |
| 56-21619 | 2/1981 | Japan | 55/DIG. 39 |
| 3-186309 | 8/1991 | Japan | 96/59 |
| 4-74505 | 3/1992 | Japan | 96/59 |
| 2204810 | 11/1988 | United Kingdom | 96/134 |

*Primary Examiner*—Richard L. Chiesa
*Attorney, Agent, or Firm*—Richard C. Litman

[57] ABSTRACT

A frameless electrostatic air filter used in heating and air conditioning systems includes a plurality of filter media layers and an internal support grill and has no external support grill or frame. The frameless electrostatic air filter has an internal support grill to support the filter media layers and a fabric edging that is secured in place all the way around the edge of the frameless electrostatic air filter. The center of the frameless electrostatic air filter is secured with a plastic rivet. The frameless electrostatic air filter seats and seals tight to the inside lip of filter receptacles.

9 Claims, 2 Drawing Sheets

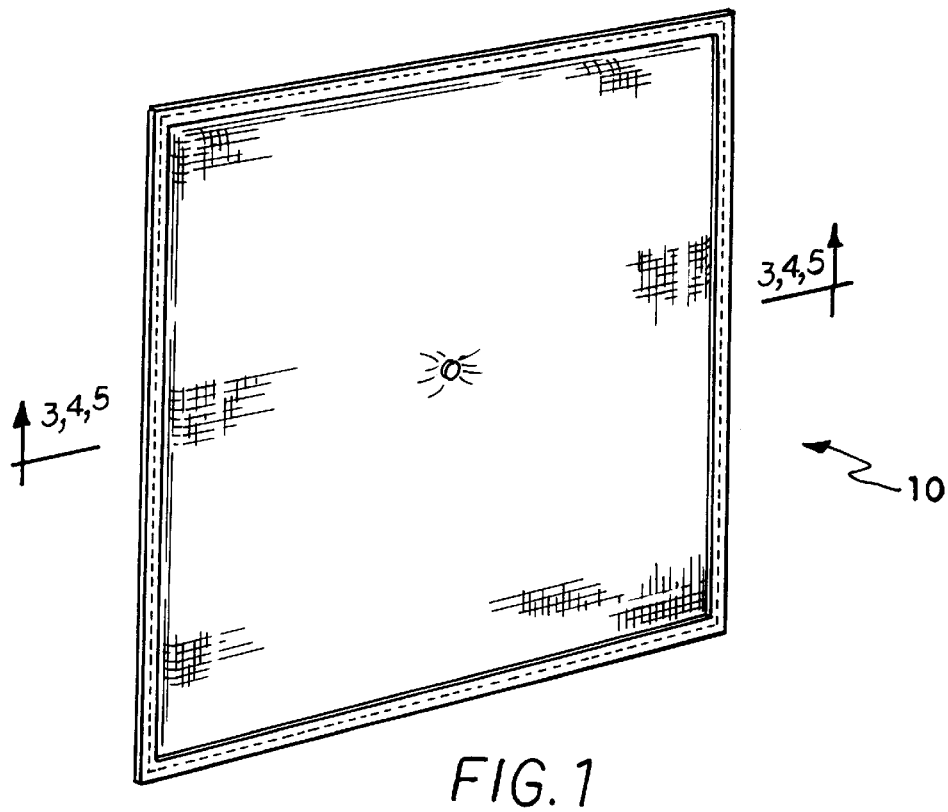
FIG. 1
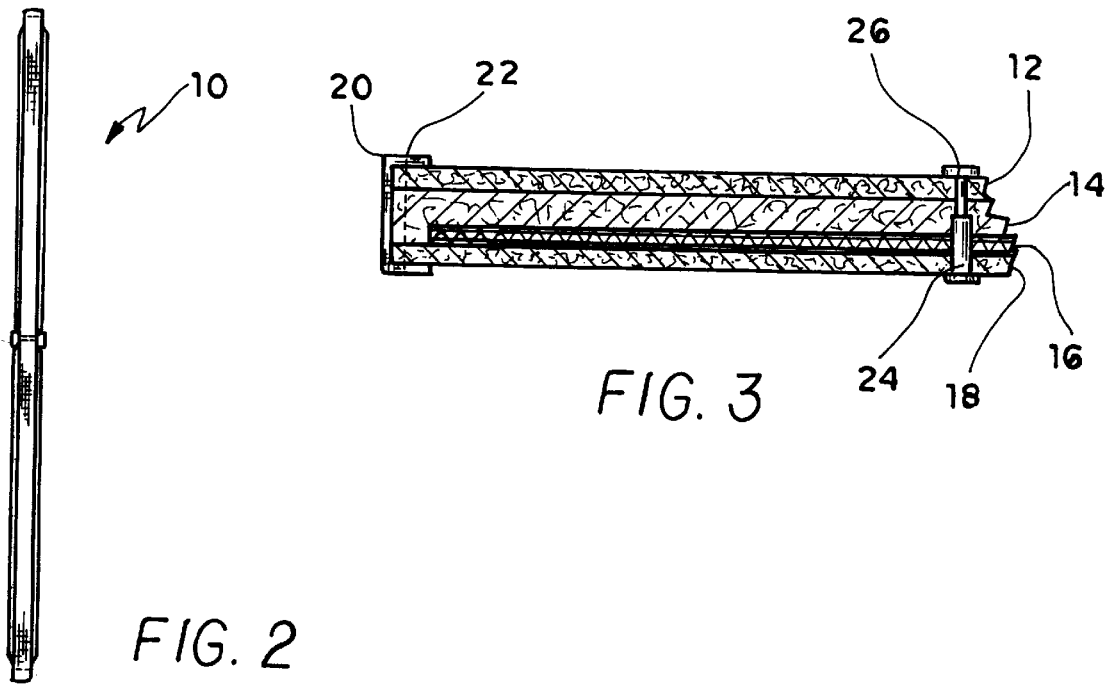
FIG. 2
FIG. 3

FRAMELESS ELECTROSTATIC AIR FILTER WITH INTERNAL SUPPORT GRILL

CROSS REFERENCE TO RELATED APPLICATIONS

This application claims the benefit of U.S. Provisional Application Ser. No. 60/044,041 filed May 5, 1997.

BACKGROUND OF THE INVENTION

1. Field of the Invention

The present invention relates generally to air filters and, more specifically, to a washable frameless electrostatic air filter for use in ventilation systems of heating and air conditioning units in homes and businesses.

2. Description of the Related Art

Electrostatic air filters have been known in the art for many years. Some of these air filters have configurations in which the filtering media accumulates a charge by virtue of air passing through that media. Other types of electrostatic air filters use some type of high-voltage source electrically connected to the filter media, and/or a similar high-voltage source electrically connected to an electrode which is used to ionize particles in the air that are then collected by a filter media. These types of air filters are efficient in removing pollutants from the air and help keep clean the ventilation systems on heating and air conditioning units.

However, prior electrostatic air filters have had some disadvantages. One major problem is noise that is generated by metal and plastic frames on the air filters when heating or air conditioning units turn on or off. Often when the units are just running the air filters vibrate in the filter receptacle and make noise. Another common problem is the inability of air filters to seat and seal tight to the inside lip of filter receptacles. This allows dirty air to go around the air filter frame without being filtered, thus, lowering the cleaning capabilities of the air filter. Thus, there is a need for an improved electrostatic air filter which does not have these problems.

U.S. Pat. No. 3,768,642, issued on Oct. 30, 1973 to Elwood F. Hansen et al., describes a shipping and dispensing carton for a stack of compressed and bound resilient, compressible frameless air filter elements. Hansen et al. '642 do not suggest the frameless electrostatic air filter configuration according to the claimed invention.

U.S. Pat. No. 3,877,909, issued on Apr. 15, 1975 to Elwood F. Hansen, describes an internally supported, composite frameless filter. Hansen '909 does not suggest the frameless electrostatic air filter configuration according to the claimed invention.

U.S. Pat. No. 4,902,306, issued on Feb. 20, 1990 to Gilbert W. Burnett et al., describes a dual-dipole electrostatic air filter. Burnett et al. do not suggest the frameless electrostatic air filter configuration according to the claimed invention.

U.S. Pat. No. 5,330,559, issued on Jul. 19, 1994 to William A. Cheney et al., describes an electrostatic air cleaner. Cheney et al. '559 do not suggest the frameless electrostatic air filter configuration according to the claimed invention.

U.S. Pat. No. 5,336,299, issued on Aug. 9, 1994 to Gary L. Savell, describes a multi-layered electrostatic air filter. Savell does not suggest the frameless electrostatic air filter configuration according to the claimed invention.

U.S. Pat. No. 5,403,482, issued on Apr. 4, 1995 to William C. Steere et al., describes a coreless filter. Steere et al. do not suggest the frameless electrostatic air filter configuration according to the claimed invention.

U.S. Pat. No. 5,474,599, issued on Dec. 12, 1995 to William A. Cheney et al., describes an electrostatic air cleaner. Cheney et al. '599 do not suggest the frameless electrostatic air filter configuration according to the claimed invention.

U.S. Pat. No. 5,509,950, issued on Apr. 23, 1996 to Peter van de Graaf et al., describes a filter device including a filter element having a filter medium arranged in zig-zag shaped pleats. Van de Graaf et al. do not suggest the frameless electrostatic air filter according to the claimed invention.

U.S. Pat. No. 5,597,645, issued on Jan. 28, 1997 to Richard D. Pike et al., describes a nonwoven web of filter media for gaseous fluids. Pike et al. do not suggest the frameless electrostatic air filter configuration according to the claimed invention.

U.S. Pat. No. 5,616,169, issued on Apr. 1, 1997 to Ernest de Ruiter et al., describes a seal-free and frame-free odor and/or pollutant filter. De Ruiter et al. do not suggest the frameless electrostatic air filter configuration according to the claimed invention.

U.S. Pat. No. 5,618,324, issued on Apr. 8, 1997 to Bruno Sommer et al., describes a filter insert for a vehicle air conditioning system. Sommer et al. do not suggest the frameless electrostatic air filter configuration according to the claimed invention.

France Patent document number 2,354,125, published on Feb. 10, 1978, describes an air filter with a pleated cartridge filter. France '125 does not suggest the frameless electrostatic air filter configuration according to the claimed invention.

German Patent document number 1,203,936, published on Oct. 28, 1965, describes an exchangeable air filter. German '936 does not suggest the frameless electrostatic air filter configuration according to the claimed invention.

Great Britain Patent document number 2,204,810 A, published on Nov. 23, 1988, describes an air filter including two layers of resilient foamed polypropylene. Great Britain '810 does not suggest the frameless electrostatic air filter configuration according to the claimed invention.

None of the above inventions and patents, taken either singly or in combination, is seen to describe the instant invention as claimed.

SUMMARY OF THE INVENTION

The present invention is a frameless electrostatic air filter that is used in heating and air conditioning systems. The frameless electrostatic air filter includes a plurality of filter media layers and a internal support grill, but the frameless electrostatic air filter has no external support grill or frame. Instead the frameless electrostatic air filter has an internal support grill to support the filter media layers and a fabric edging that is secured in place all the way around the frameless electrostatic air filter's edge. The frameless electrostatic air filter is also secured in the center with a plastic rivet. The frameless electrostatic air filter seats and seals tight to the inside lip of filter receptacles.

Three embodiments of the frameless electrostatic air filter of the present invention are described. Two embodiments include three non-conductive filter media layers and one non-conductive internal support grill, and the other embodiment includes four non-conductive filter media layers and one non-conductive internal support grill. Each embodiment includes at least two non-conductive filter media layers of woven polypropylene mesh of honeycomb design with Microblocker® which inhibits bacteria growth. These polypropylene meshes of honeycomb design are very well known for their ability to create an element of static electricity or static cling as it's called and being able to attract and hold dirt particles from the air. One embodiment also includes a non-conductive filter media layer essentially consisting of polyester, another excellent conductor of static electricity and excellent at removing smaller particles of dirt that the first layer of filter media misses.

Most importantly, each embodiment includes a non-conductive internal support grill to support the filter media layers. The internal support grill is from about ¾ inch to about 1 inch diamond shaped polyethylene plastic mesh depending on the size of the frameless electrostatic air filter. The polyethylene plastic mesh not only stops the frameless electrostatic air filter from being sucked into the heating or air conditioning duct work, but also serves as a spacer between two other layers of filter media. This space creates more air flow which creates friction and static electricity so that the filter media layers can attract and filter out more airborne dirt particles and increase the efficiency of the frameless electrostatic air filter.

A 1¼ to 1½ inch wide fabric edging is sewn onto the filter media layers at the same time that all of the filter media layers are sewn together by a stitching. The fabric edging gives the frameless electrostatic air filter a uniform edge with the same amount of edging showing on each side, which is about ⅝ of an inch. The fabric edging is cut and applied in a manner such that there are four sharp corners around the air filter. The fabric edging is preferably made out of nylon due to its static electricity abilities. However, the fabric edging may also be made out of other material, such as cotton, rayon, etc. Nylon fabric edging seats and seals tighter in the air filter receptacle and stops dirty air from going around a filter frame without being filtered.

The stitching goes completely through the filter media layers and on both sides of the fabric edging. All four corners of the frameless electrostatic air filter are double stitched for reinforcement and so the stitching will not unravel. The stitching does not go through the polyethylene plastic mesh internal support grill. The internal support grill is set in about ¾ inch from the outer edge of the frameless electrostatic air filter all the way around, on all four sides. Once the fabric edging is cut, applied to the corners of the air filter, and stitched, the fabric edged corners are heat sealed to prevent the fabric edging from fraying back.

A hole is heat punched through the center of the frameless electrostatic air filter to prevent the filter media layers from fraying back, and then the female part of a plastic rivet is installed into the hole. From the other side of the frameless electrostatic air filter the male part of the plastic rivet screws together with the female part and locks tight. The main reason this type of rivet is used is not only to secure the filter media layers to the polyethylene plastic mesh internal support grill, but also because this type of rivet is not restrictive to air flow since the rivet does not pinch the layers of the frameless electrostatic air filter together. Thus the riveted area of the filter is still able to filter out airborne dirt particles. The frameless electrostatic air filters seat and seal tight to the inside lip of filter receptacles.

Accordingly, it is a principal object of the invention to provide a frameless electrostatic air filter that is washable yet has no plastic or metal frame and no external support grill, thus, allowing the frameless electrostatic air filter to seat and seal in the filter receptacle without making noise and to be sturdy so as not to be sucked into the ductwork.

It is another object of the invention to provide a frameless electrostatic air filter with a polyethylene plastic mesh internal support grill.

A further object of the invention to provide a frameless electrostatic air filter with a fabric edging.

It is yet a further object of the invention to provide improved elements and arrangements thereof in a frameless electrostatic air filter for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 1 is a front elevational view of a frameless electrostatic air filter according to the present invention.

FIG. 2 is a side view of the inventive frameless electrostatic air filter.

FIG. 3 is a center section cut away side view of a first embodiment of a frameless electrostatic air filter according to the invention taken along lines 3—3 of FIG. 1.

Similar reference characters denote corresponding features consistently throughout the attached drawings.

DETAILED DESCRIPTION OF THE PREFERRED EMBODIMENTS

Figure 4:
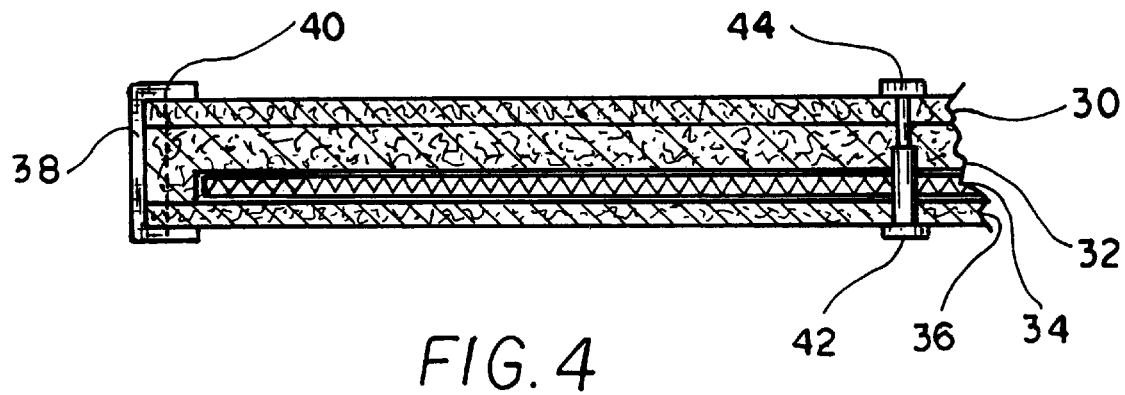
FIG. 4 is a center section cut away side view of a second embodiment of a frameless electrostatic air filter according to the invention taken along lines 4—4 of FIG. 1.

Referring to FIG. 1, a frameless electrostatic air filter 10 is shown that used to filter air in heating and air conditioning units in homes and businesses. The frameless electrostatic air filter element 10 of the present invention is novel insofar as it is a self-supporting structure having sufficient rigidity and integrity, whereby the use of a frame, as was standard in the prior art, is not needed. The frameless electrostatic air filter 10 seats and seals tight to the inside lip of filter receptacles.

A first embodiment of a frameless electrostatic air filter of the present invention includes three non-conductive filter media layers 12, 14, and 18 and one non-conductive internal support grill 16, as shown in FIG. 3. The first layer 12 of this embodiment is a filter media layer of woven polypropylene mesh of honeycomb design, as is known in the art, with Microblocker® that inhibits bacteria growth. This layer 12 of filter media is a polypropylene mesh of honeycomb design that is very well for it's ability to create an element of static electricity or static cling as it's called and being able to attract and hold dirt particles from the air.

The second layer 14 of the first embodiment is a filter media layer which essentially consists of polyester, another excellent conductor of static electricity and excellent at removing smaller particles of dirt that the first layer 12 of filter media misses.

The third layer 16 of the first embodiment is an internal support grill to support filter media layers 12, 14, and 18. The internal support grill 16 is from about ¾ to about 1 inch diamond shaped polyethylene plastic mesh depending on the size of the frameless electrostatic air filter. The polyethylene plastic mesh internal support grill 16 not only stops the frameless electrostatic air filter from being sucked into the heating or air conditioning duct work, but also serves as a spacer between filter media layer 14 and filter media layer 18. This space creates more air flow which creates friction and static electricity so that filter media layers 12, 14, and 18 can attract and filter out more airborne dirt particles and increase the efficiency of the frameless electrostatic air filter.

The fourth and final layer 18 of the first embodiment is another layer of filter media very similar to filter media layer 12 which is the first layer of the filter. The fourth layer 18 is also made out of woven polypropylene with Microblocker® that not only encases and covers the polyethylene plastic mesh internal grill 16 so that there is no external grill, but also filters out dirt particles that may have made it through filter layers 12 and 14.

A 1¼ inch wide fabric edging 20 is sewn onto filter media layers 12, 14, and 18 at the same time that all of the filter media layers are sewn together by stitching 22. It gives the frameless electrostatic air filter a uniform edge with the same amount of fabric edging 20 showing on each side, which is about ⅝ of an inch. The fabric edging 20 is cut and applied in a manner such that there are four sharp corners around the air filter. The fabric edging 20 is preferably made out of nylon due to its static electricity abilities. However, the fabric edging 20 may also be made out of other material, such as cotton, rayon, etc. Nylon fabric edging seals tighter in the air filter receptacle and stops dirty air from going around a filter frame without being filtered.

The stitching 22 goes completely through filter media layers 12, 14, and 18 and on both sides of the fabric edging 20. All four corners of the frameless electrostatic air filter are double stitched for reinforcement and so the stitching 22 will not unravel. The stitching 22 does not go through the polyethylene plastic mesh internal support grill 16. The internal support grill 16 is set in about ¾ of an inch from the outer edge of the frameless electrostatic air filter all the way around, on all four sides. Once the fabric edging 20 is cut, applied to the corners of the air filter, and stitched, the fabric edged corners are heat sealed to prevent the fabric edging 20 from fraying back.

A hole is heat punched through the center of the frameless electrostatic air filter to prevent filter media layers 12, 14, and 18 from fraying back, and then the female part 24 of a plastic rivet is installed into the hole. From the other side of the filter a male part 26 of the plastic rivet screws together with female part and locks tight. The main reason this type of rivet is used is not only to secure filter media layers 12, 14, and 18 to the polyethylene plastic mesh internal support grill 16, but also because this type of rivet is not restrictive to air flow since the rivet does not pinch the layers of the frameless electrostatic air filter together. Thus the riveted area of the air filter is still able to filter out airborne dirt particles.

A second embodiment of a frameless electrostatic air filter 10 of the present invention includes three non-conductive filter media layers 30, 32, and 36 and one non-conductive internal support grill 34, as shown in FIG. 4. The first layer 30 of this embodiment is a filter media layer of woven polypropylene mesh of honeycomb design, as is known in the art, with Microblocker® that inhibits bacteria growth. This polypropylene mesh of honeycomb design is very well known for it's ability to create an element of static electricity or static cling as it's called and being able to attract and hold dirt particles from the air.

The second layer 32 of the second embodiment is a very similar filter media layer made of woven polypropylene filter media. The second layer 32 also includes Microblocker®, and not only encases and covers the third layer 34 so that there is no external grill, but also filters out dirt particles that may have made it through the first filter media layer 30.

The third layer 34 of the second embodiment is an internal support grill to support filter media layers 30, 32, and 36. The internal support grill 34 is from about ¾ inch to about 1 inch diamond shaped polyethylene plastic mesh depending on the size of the frameless electrostatic air filter. The polyethylene plastic mesh 34 not only stops the frameless electrostatic air filter from being sucked into the heating or air conditioning duct work, but also serves as a spacer between filter media layer 32 and filter media layer 36. This space creates more air flow which creates friction and static electricity so that filter media layer 36 can attract and filter out more airborne dirt particles and increase the efficiency of the frameless electrostatic air filter.

The fourth and final layer 36 of the second embodiment is another layer of filter media very similar to filter media layer 30 which is the first layer of the frameless electrostatic air filter. The fourth layer 36 is also made out of woven polypropylene with Microblocker® that not only encases and covers the polyethylene plastic mesh internal grill 34 so that there is no external grill, but also filters out dirt particles that may have made it through filter media layers 30 and 32.

A 1¼ to 1½ inch wide fabric edging 38 is sewn onto filter media layers 30, 32, and 36 at the same time that all of the filter media layers are sewn together by stitching 40. It gives the frameless electrostatic air filter a uniform edge with the same amount of fabric 38 edging showing on each side, which is about ⅝ of an inch. The fabric edging 38 is cut and applied in a manner such that there are four sharp corners around the air filter. The fabric edging 38 is preferably made out of nylon due to its static electricity abilities. However, the fabric edging 38 may also be made out of other material, such as cotton, rayon, etc. Nylon fabric edging seals tighter in the air filter receptacle and stops dirty air from going around a filter frame without being filtered.

The stitching 40 goes completely through filter media layers 30, 32, and 36 and on both sides of fabric edging 38. All four corners of the frameless electrostatic air filter are double stitched for reinforcement and so the stitching 40 will not unravel. The stitching does not go through the polyethylene plastic mesh internal support grill 34. The internal support grill 34 is set in about ¾ of an inch from the outer edge of the frameless electrostatic air filter all the way around, on all four sides. Once the fabric edging 38 is cut, applied to the corners of the air filter, and stitched, the fabric edged corners are heat: sealed to prevent the fabric edging 38 from fraying back.

A hole is heat punched through the center of the frameless electrostatic air filter to prevent filter media layers 30, 32, and 36 from fraying back, and then the female part 42 of a plastic rivet is installed into the hole. From the other side of the filter the male part 44 of the plastic rivet screws together with female part 42 and locks tight. The main reason this type of rivet is used is not only to secure the filter media layers 30, 32, and 36 to the polyethylene plastic mesh internal support grill 34, but also because this type of rivet is not restrictive to air flow since the rivet does not pinch the layers of the frameless electrostatic air filter together. Thus the riveted area of the frameless electrostatic air filter is still able to filter out airborne dirt particles.

Figure 5:
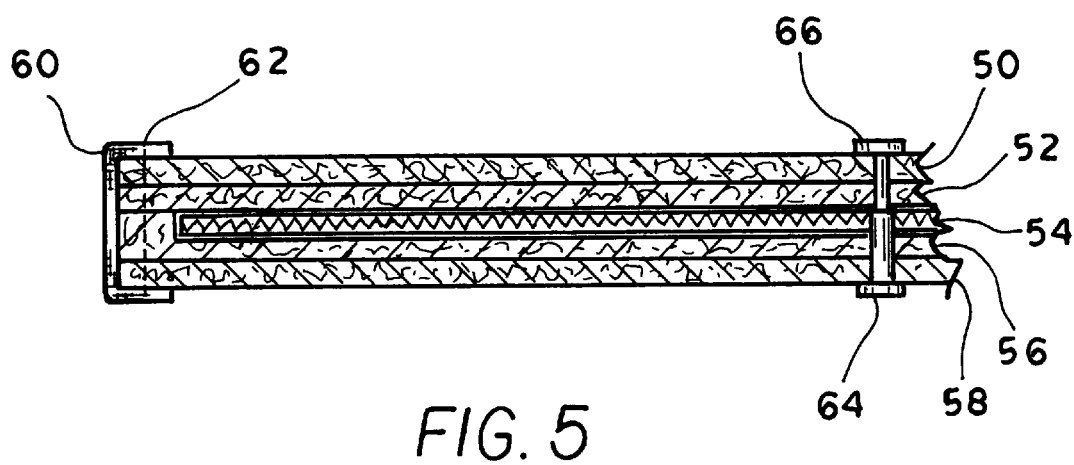
FIG. 5 is a center section cut away side view of a third embodiment of a frameless electrostatic air filter according to the invention taken along lines 5—5 of FIG. 1.

The third embodiment of a frameless electrostatic air filter 10 of the present invention includes four non-conductive filter media layers 50, 52, 56 and 58 and one non-conductive internal support grill 54, as shown in FIG. 5. The first layer 50 of this embodiment is a woven polypropylene mesh of honeycomb design, as is known in the art, with Microblocker® that inhibits bacteria growth. It is very well known for it's ability to create an element of static electricity or static cling as it's called and being able to attract and hold dirt particles from the air.

The second layer 52 of the third embodiment is a filter media layer very similar to the filter media layer which is the first layer 50 of the frameless electrostatic air filter. The second layer 52 is also made out of woven polypropylene with Microblocker® and removes additional particles of dirt that the first layer of filter media 50 misses.

The third layer 54 of the third embodiment is an internal support grill to support filter media layers 50, 52, 56, and 58. The internal support grill 54 is from about ¾ to about 1 inch diamond shaped polyethylene plastic mesh depending on the size of the frameless electrostatic air filter. The polyethylene plastic mesh internal support grill 54 not only stops the frameless electrostatic air filter from being sucked into the heating or air conditioning duct work, but also serves as a spacer between filter media layer 52 and filter media layer 56. This space creates more air flow which creates friction and static electricity so that filter media layer 56 can attract and filter out more airborne dirt particles and increase the efficiency of the frameless electrostatic air filter.

The fourth layer 56 of the third embodiment is a filter media layer very similar to filter media layer 52 and is also made out of woven polypropylene with Microblocker® that not only covers the polyethylene plastic mesh internal grill 54 so that there is no external grill, but also filters out dirt particles that may have made it through filter media layers 50 and 52.

The fifth and final layer 58 of the third embodiment is another layer of filter media very similar to filter media layer 50 which is the first layer of the frameless electrostatic air filter.

A 1¼ to 1½ inch wide fabric edging 60 is sewn onto filter media layers 50, 52, 56, and 58 at the same time that all of the filter media layers are sewn together by stitching 62. It gives the frameless electrostatic air filter a uniform edge with the same amount of edging showing on each side, which is about ⅝ of an inch. The fabric edging 60 is cut and applied in a manner such that there are four sharp corners around the air filter. The fabric edging 60 is preferably made out of nylon fabric due to its static electricity abilities. However, the fabric edging 60 may also be made out of other material, such as cotton, rayon, etc. Nylon fabric edging 60 seals tighter in the filter receptacle and stops dirty air from going around an air filter frame without being filtered.

The stitching 62 goes completely through filter media layers 50, 52, 56 and 58 and on both sides of the fabric edging 60. All four corners of the frameless electrostatic air filter are double stitched for reinforcement and so the stitching 62 will not unravel. The stitching 62 does not go through the polyethylene plastic mesh internal support grill 54. The internal support grill 54 is set in about ¾ of an inch from the outer edge of the air filter all the way around, on all four sides. Once the fabric edging 60 is cut, applied to the corners of the air filter, and stitched, the fabric edged corners are heat sealed to prevent the fabric edging 60 from fraying back.

A hole is heat punched through the center of the frameless electrostatic air filter to prevent filter media layers 50, 52, 56, and 58 from fraying back, and then the female part 64 of a plastic rivet is installed into the hole. From the other side of the filter the male part 66 of the plastic rivet screws together with female part 64 and locks tight. The main reason this type of rivet is used is not only to secure filter media layers 50, 52, 56, and 58 to the polyethylene plastic mesh internal support grill 54, but also because this type of rivet is not restrictive to air flow since the rivet does not pinch the layers of the frameless electrostatic air filter together. Thus the riveted area of the frameless electrostatic air filter is still able to filter out airborne dirt particles.

It is to be understood that the present invention is not limited to the embodiments described above, but encompasses any and all embodiments within the scope of the following claims.

I claim:

1. A frameless electrostatic air filter comprising:

(a) a first filter media means comprised of first non-conductive material and having a filter mesh for generating an electrostatic charge;

(b) a second filter media means comprised of a second non-conductive material and adjacent to said first filter media means;

(c) an internal support means comprised of a third non-conductive material and adjacent to said second filter media means;

(d) a third filter media means comprised of a fourth non-conductive material and adjacent to said internal support means;

(e) a fourth filter media means comprised of a fifth non-conductive material and adjacent to the third filter media means; and, (f) containment means holding said filter media means and said internal support means together.

2. The frameless electrostatic air filter according to claim 1, wherein said first filter media means, said second filter media means, said third filter media means, and said fourth filter media means are made of a polypropylene material.

3. The frameless electrostatic air filter according to claim 1, wherein said filter media means include a bacteria growth inhibitor which helps control the growth of bacteria on said filter media means.

4. The frameless electrostatic air filter according to claim 1, wherein said internal support means are made of a polyethylene plastic material.

5. The frameless electrostatic air filter according to claim 1, wherein said containment means includes a fabric edging means, a stitching means, and a plastic rivet.

6. The frameless electrostatic air filter according to claim 5, wherein said fabric edging means are made of nylon material.

7. The frameless electrostatic air filter according to claim 5, wherein said fabric edging means are cut, applied in a manner such that there are four sharp fabric edged corners around said air filter, and stitched by said stitching means.

8. The frameless electrostatic air filter according to claim 7, wherein said four sharp fabric edged corners are heat sealed to prevent said fabric edging means from fraying back.

9. The frameless electrostatic air filter according to claim 5, wherein said stitching means pierces said fabric edging means and each of said filter media means, and are arranged, dimensioned and configured so as not to pierce said internal support means.

* * * * *